(12) United States Patent
Xiong et al.

(10) Patent No.: US 9,317,088 B2
(45) Date of Patent: Apr. 19, 2016

(54) POWER ON CIRCUIT

(71) Applicant: ScienBiziP Consulting (Shen Zhen) Co., Ltd., Shenzhen (CN)

(72) Inventors: Jin-Liang Xiong, Wuhan (CN); Yong-Zhao Huang, Wuhan (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 338 days.

(21) Appl. No.: 14/078,591

(22) Filed: Nov. 13, 2013

(65) Prior Publication Data

US 2014/0143561 A1 May 22, 2014

(30) Foreign Application Priority Data

Nov. 19, 2012 (CN) .......................... 2012 1 0467697

(51) Int. Cl.
*G06F 1/00* (2006.01)
*G06F 1/26* (2006.01)
*G06F 3/0481* (2013.01)
*G06F 3/0484* (2013.01)

(52) U.S. Cl.
CPC ................ *G06F 1/26* (2013.01); *G06F 3/0481* (2013.01); *G06F 3/04842* (2013.01)

(58) Field of Classification Search
CPC ............................ G06F 3/04842; G06F 3/0481
See application file for complete search history.

(56) References Cited

U.S. PATENT DOCUMENTS

| | | | | |
|---|---|---|---|---|
| 5,764,547 A * | 6/1998 | Bilich | ........................ | G06F 1/32 713/321 |
| 6,125,449 A * | 9/2000 | Taylor | ........................ | G06F 1/26 713/320 |
| 8,154,882 B2 * | 4/2012 | Liu | ........................ | G06F 1/1601 361/788 |
| 8,407,496 B2 * | 3/2013 | Zhou | ........................ | G06F 1/266 361/788 |
| 2005/0114716 A1 * | 5/2005 | O | ........................... | G06F 1/3218 713/300 |
| 2008/0162950 A1 * | 7/2008 | Brown | ................... | G06F 1/3203 713/300 |
| 2009/0125733 A1 * | 5/2009 | Lin | ......................... | G06F 1/266 713/310 |
| 2009/0307382 A1 * | 12/2009 | Chan | ................... | G06F 13/4081 710/16 |

* cited by examiner

*Primary Examiner* — Jaweed A Abbaszadeh
*Assistant Examiner* — Xuxing Chen
(74) *Attorney, Agent, or Firm* — Novak Druce Connolly Bove + Quigg LLP

(57) ABSTRACT

A power on circuit is connected between a video graphics array (VGA) connector of a display and a super input output (SIO) chip of a motherboard. The power on circuit includes first to fourth electronic switches and a timer. When a power button of the display is pressed, a serial data line pin of the VGA connector outputs a high level signal to turn on the first electronic switch, the second electronic switch is turned on, the fourth electronic switch is turned on, and the timer outputs a periodic pulse signal. When the pulse signal outputted from the timer is at a high level, the third electronic switch is turned on, the SIO chip receives a low level signal from the fourth and third electronic switches, and the motherboard is turned on.

11 Claims, 1 Drawing Sheet

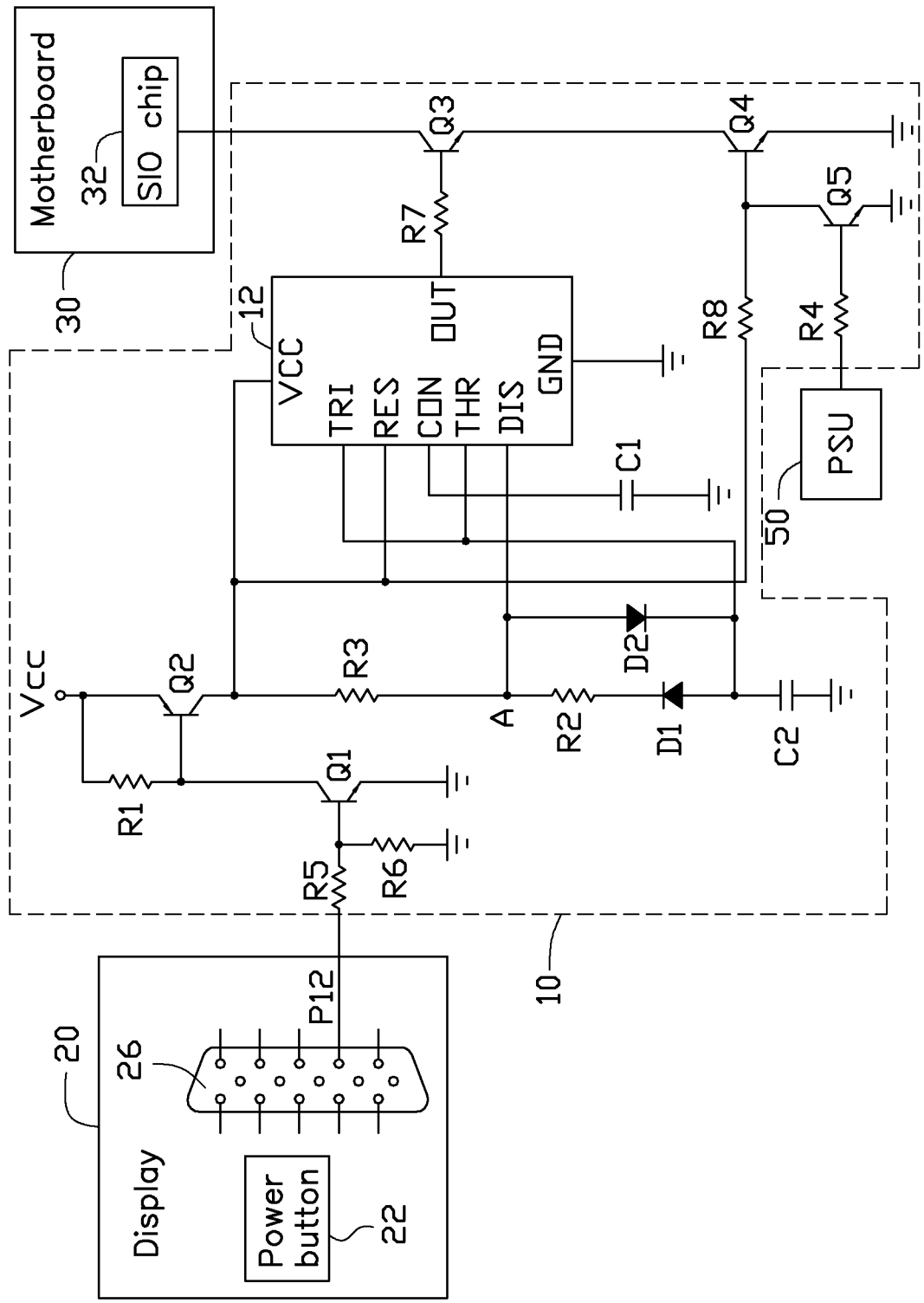

POWER ON CIRCUIT

BACKGROUND

1. Technical Field

The present disclosure relates to a power on circuit.

2. Description of Related Art

Each desktop computer includes a power button on a front panel of a chassis. However, most chassis are generally placed under computer desks. When one wants to power on the desktop computer, one needs to bend over to press the power button, which is very inconvenient.

BRIEF DESCRIPTION OF THE DRAWING

Many aspects of the present disclosure can be better understood with reference to the following drawing. The components in the drawing are not necessarily drawn to scale, the emphasis instead being placed upon clearly illustrating the principles of the present embodiments.

The FIGURE is a circuit diagram of a power on circuit in accordance with an embodiment of the present disclosure.

DETAILED DESCRFIPTION

The disclosure, including the accompanying drawing, is illustrated by way of example and not by way of limitation. It should be noted that references to "an" or "one" embodiment in this disclosure are not necessarily to the same embodiment, and such references can mean "at least one."

The FIGURE shows an embodiment of a power on circuit 10. The power on circuit 10 is connected to a display 20, a motherboard 30, and a power supply unit (PSU) 50. The power on circuit 10 includes a 555 timer 12, two capacitors C1 and C2, two diodes D1 and D2, five electronic switches Q1-Q5, and eight resistors R1-R8. The display 20 includes a power button 22 and a 15-pin video graphics array (VGA) connector 26. The motherboard 30 includes a super input output (SIO) chip 32.

The 555 timer 12 includes a power pin VCC, a trigger pin TRI, a reset pin RES, a control pin CON, a threshold pin THR, a discharge pin DIS, a ground pin GND, and an output pin OUT. Each of the electronic switches Q1-Q5 includes a first terminal, a second terminal, and a third terminal. Each of the diodes D1 and D2 includes an anode and a cathode. The first terminal of the electronic switch Q1 is connected to a serial data line (SDA) pin P12 (namely the twelfth pin) of the VGA connector 26 through the resistor R5, and grounded through the resistor R6. The second terminal of the electronic switch Q1 is connected to a power supply Vcc through the resistor R1. The third terminal of the electronic switch Q1 is grounded. The first terminal of the electronic switch Q2 is connected to the second terminal of the electronic switch Q1. The second terminal of the electronic switch Q2 is connected to the power supply Vcc. The power pin VCC of the 555 timer 12 is connected to the third terminal of the electronic switch Q2. The trigger pin TRI of the 555 timer 12 is connected to the anode of the diode D1 and the cathode of the diode D2, and grounded through the capacitor C2. The cathode of the diode D1 is connected to the third terminal of the electronic switch Q2 through the resistor R2 and the resistor R3 in that order. The anode of the diode D2 is connected to a node A between the resistor R2 and the resistor R3. The reset pin RES of the 555 timer 12 is connected to the third terminal of the electronic switch Q2. The control pin CON of the 555 timer 12 is grounded through the capacitor C1. The threshold pin THR of the 555 timer 12 is connected to the trigger pin TRI of the 555 timer 12. The discharge pin DIS of the 555 timer 12 is connected to the node A. The ground pin GND of the 555 timer 12 is grounded. The first terminal of the electronic switch Q3 is connected to the output pin OUT of the 555 timer 12 through the resistor R7. The second terminal of the electronic switch Q3 is connected to the SIO chip 32. The first terminal of the electronic switch Q4 is connected to the third terminal of the electronic switch Q2 through the resistor R8. The second terminal of the electronic switch Q4 is connected to the third terminal of the electronic switch Q3. The third terminal of the electronic switch Q4 is grounded. The first terminal of the electronic switch Q5 is connected to the PSU 50 through the resistor R4, to receive a power good signal PWR_OK from the PSU 50. The second terminal of the electronic switch Q5 is connected to the first terminal of the electronic switch Q4. The third terminal of the electronic switch Q5 is grounded.

According to the specification of a 15-pin video graphics array (VGA) connector, it may be understood that, the SDA pin P12 of the VGA connector 26 outputs a high level signal, such as logic 1, when the power button 22 is pressed to turn on the display 20, and the SDA pin P12 of the VGA connector 26 outputs a low level signal, such as logic 0, when the display 20 is in a turned off state. According to the specification of a motherboard, it may be understood that, when the SIO chip 32 receives a transient low level signal, the motherboard 30 is turned on, and after the motherboard 30 is turned on, the SIO chip 32 maintains receiving a high level signal, and the motherboard 30 can operate normally.

When the power button 22 is pressed to turn on the display 20, the SDA pin P12 of the VGA connector 26 outputs a high level signal to turn on the electronic switch Q1. The electronic switch Q2 is turned on. The power supply Vcc supplies power to the 555 timer 12 through the electronic switch Q2. The output pin OUT of the 555 timer 12 outputs a periodic pulse signal. When the motherboard 30 is turned off, the power good signal PWR OK outputted from the PSU 50 is at a low level, the electronic switch Q5 is turned off, and the electronic switch Q4 is turned on. When the pulse signal outputted from the output pin OUT of the 555 timer is at a high level, the electronic switch Q3 is turned on, the SIO chip 32 receives a low level signal from the electronic switches Q4 and Q3, and the motherboard 30 is turned on.

When the motherboard 30 is turned on, the power good signal PWR_OK outputted from the PSU 50 turns to a high level. The electronic switch Q5 is turned on, the electronic switch Q4 is turned off. The SIO chip 32 receives a high level signal regardless of whether the electronic switch Q3 is turned on or turned off. The motherboard 30 begins to operate.

When the display 20 is in the turned off state, the SDA pin P12 of the VGA connector 26 outputs a low level signal. The electronic switch Q1 is turned off, the electronic switch Q2 is turned off, the electronic switch Q4 is turned off, and the 555 timer 12 is not powered on or does not operate. At the same time, the electronic switch Q3 is turned off, the SIO chip 32 does not receive a low level signal, and the motherboard 30 maintains a turned off state.

In one embodiment, each of the electronic switches Q1, Q3, Q4, and Q5 is an npn bipolar junction transistor (BJT), and the first terminal, the second terminal, and the third terminal of each of the electronic switches Q1, Q3, Q4, and Q5 are respectively a base, a collector, and an emitter of the npn BJT. The electronic switch Q2 is a pnp BJT, and the first terminal, the second terminal, and the third terminal of the electronic switch Q2 are respectively a base, an emitter, and a collector of the pnp BJT. In other embodiments, each of the electronic switches Q1, Q3, Q4, and Q5 may be an n-channel metal-oxide semiconductor field-effect transistor, or another switch having similar functions. The electronic switch Q2 may be a p-channel metal-oxide semiconductor field-effect transistor, or another switch having similar functions.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power on circuit connected between a video graphics array (VGA) connector of a display and a super input output (SIO) chip of a motherboard, the power on circuit comprising:
    a first capacitor;
    a first resistor, a second resistor, and a third resistor;
    a first electronic switch comprising a first terminal connected to a serial data line (SDA) pin of the VGA connector, a second terminal connected to a power supply through a first resistor, and a third terminal grounded;
    a second electronic switch comprising a first terminal connected to the second terminal of the first electronic switch, a second terminal connected to the power supply, and a third terminal;
    a timer comprising a power pin connected to the third terminal of the second electronic switch, a trigger pin connected to the third terminal of the second electronic switch through the second resistor and the third resistor in that order, a reset pin connected to the power pin, a control pin grounded through the first capacitor, a threshold pin connected to the trigger pin, a discharge pin connected to a node between the second resistor and the third resistor, and an output pin;
    a third electronic switch comprising a first terminal connected to the output pin of the timer, a second terminal connected to the SIO chip, and a third terminal; and
    a fourth electronic switch comprising a first terminal connected to the third terminal of the second electronic switch, a second terminal connected to the third terminal of the third electronic switch, and a third terminal grounded;
    wherein in response to a power button of the display being pressed to turn on the display, the SDA pin of the VGA connector outputs a high level signal, the first electronic switch is turned on, the second electronic switch is turned on, the fourth electronic switch is turned on, the output pin of the timer outputs a periodic pulse signal; and
    wherein in response to the pulse signal outputted from the output pin of the timer being at a high level, the third electronic switch is turned on, the SIO chip receives a low level signal from the fourth and third electronic switches, the motherboard is turned on.

2. The power on circuit of claim 1, further comprising a fifth electronic switch, wherein the fifth electronic switch comprises a first terminal connected to a power supply unit (PSU) to receive a power good signal from the PSU, a second terminal connected to the first terminal of the fourth electronic switch, and a third terminal grounded; and wherein in response to the motherboard being turned on, the power good signal turns to a high level, the fifth electronic switch is turned on, the fourth electronic switch is turned off, the SIO chip receives a high level signal from the second terminal of the third electronic switch, the motherboard begins to operate.

3. The power on circuit of claim 2, further comprising a fourth resistor, wherein the first terminal of the fifth electronic switch is connected to the PSU through the fourth resistor.

4. The power on circuit of claim 3, wherein the fifth electronic switch is an npn bipolar junction transistor (BJT), and the first terminal, the second terminal, and the third terminal of the fifth electronic switch are respectively a base, a collector, and an emitter of the npn BJT.

5. The power on circuit of claim 1, further comprising a fifth resistor and a sixth resistor, wherein the first terminal of the first electronic switch is connected to the SDA pin of the VGA connector through the fifth resistor, and grounded through the sixth resistor.

6. The power on circuit of claim 1, wherein the first electronic switch is an npn bipolar junction transistor (BJT), and the first terminal, the second terminal, and the third terminal of the first electronic switch are respectively a base, a collector, and an emitter of the npn BJT.

7. The power on circuit of claim 1, further comprising a seventh resistor, wherein the first terminal of the third electronic switch is connected to the output pin of the timer through the seventh resistor.

8. The power on circuit of claim 1, wherein the third electronic switch is an npn bipolar junction transistor (BJT), and the first terminal, the second terminal, and the third terminal of the third electronic switch are respectively a base, a collector, and an emitter of the npn BJT.

9. The power on circuit of claim 1, further comprising an eighth resistor, wherein the first terminal of the fourth electronic switch is connected to the third terminal of the second electronic switch through the eighth resistor.

10. The power on circuit of claim 1, wherein the second electronic switch is a pnp bipolar junction transistor (BJT), and the first terminal, the second terminal, and the third terminal of the second electronic switch are respectively a base, an emitter, and a collector of the pnp BJT; and wherein the fourth electronic switch is an npn BJT, and the first terminal, the second terminal, and the third terminal of the fourth electronic switch are respectively a base, a collector, and an emitter of the npn BJT.

11. The power on circuit of claim 1, further comprising a first diode, a second diode, and a second capacitor, wherein the first diode comprises an anode connected to the trigger pin of the timer and grounded through the second capacitor, and a cathode connected to the discharge pin of the timer through the second resistor; and wherein the second diode comprises an anode connected to the node between the second resistor and the third resistor, and a cathode connected to the anode of the first diode.

* * * * *